United States Patent [15] 3,699,555
Du Vall [45] Oct. 17, 1972

[54] APPARATUS FOR RAPID ACTION DISPLACEMENT CONTROL

[72] Inventor: Wilbur E. Du Vall, Torrance, Calif.

[73] Assignee: Zerox Corporation, Stamford, Conn.

[22] Filed: Oct. 23, 1970

[21] Appl. No.: 83,491

[52] U.S. Cl. ............................340/174.1 C, 318/617
[51] Int. Cl. ..........................................G11b 21/08
[58] Field of Search.............318/571, 603, 616, 617; 340/174.1 C

[56] References Cited

UNITED STATES PATENTS

| | | | |
|---|---|---|---|
| 3,209,338 | 9/1965 | Romvari | 340/174.1 C |
| 3,241,015 | 3/1966 | Allen | 318/617 |
| 3,399,391 | 8/1968 | Barrosse | 340/174.1 C |
| 3,555,392 | 1/1971 | Reuteler | 318/571 |

*Primary Examiner*—Vincent P. Canney
*Attorney*—Smyth, Roston & Pavitt

[57] ABSTRACT

A transducer carriage for multiple, movable heads in a multiple disk file is displaced from one position to another one by a linear motor, whose stator is also mounted on a carriage for recoilless reaction to rapid acceleration/deceleration control of the motor coil. A command signal is developed to be proportionate to the square root of deceleration rate times distance to be traversed due to position change, particularly for determining the beginning of deceleration. Servo loops provide for initial acceleration control followed by the deceleration phase merging with a fine position control.

4 Claims, 7 Drawing Figures

PATENTED OCT 17 1972 3,699,555

2 Sheets-Sheet 1

INVENTOR:
Wilbur E. DuVall

By Smyth, Roston & Pavitt

ATTORNEYS

PATENTED OCT 17 1972

3,699,555

2 Sheets-Sheet 2

INVENTOR:
Wilbur E. DuVall

By Smyth, Roston & Pavitt

ATTORNEYS

APPARATUS FOR RAPID ACTION DISPLACEMENT CONTROL

The present invention relates to rapid action displacement control, for control of a change in position of on object, the change to occur in between well defined positions of the object. More particularly, the invention relates to the control of the position of one or several transducers in relation to one or several magnetic recording disks pertaining, for example, to a so-called movable head disk file that is used as bulk storage facility in data processing systems, the movable head being representative of a displaceable object.

A transducer, or read and write transducer assembly of a movable head cooperates with a particular concentric track on a rotating disk as long as the head retains a selected position. That position of the head is also defined as a particular radial position of the transducer(s) therein, relative to the disk's axis. For a change of tracks, the head has to be displaced radially to that axis so that the transducer(s) may lock in on another track. In order to minimize access time to information on any particular track, the head must be moved as rapidly as possible from its present position to the desired position, for cooperation with the desired track. A rapid action displacement of this kind requires the head to be accelerated at first and as long as possible, and then to be decelerated and stopped right on the new position. Moreover, it is desirable to have the displacement control operation merge in a tracking operation that maintains the transducer or transducer assembly in the head in the desired position.

It must now be observed that a relative large number of transducer heads are provided in multiple disk system, whereby the heads cooperate with a corresponding number of disk surfaces of the file. All these heads are mounted on a common carrier that is linked to a rather powerful displacement actuator. A particular problem has arisen in the past, in that the rapid action displacement operation itself sets up severe shocks in the entire equipment. The carrier is accelerated from a period and a position of rest, so that there is a sudden onset of relative high acceleration, a subsequent reverse to deceleration and, often severe braking.

These resulting shocks are detrimental to the equipment per se, and the deteriorate accuracy of positioning and, therefor, overall operational speed.

In copending application of common assignee, Ser. No. 53,500, a displacement actuator is disclosed minimizing the production of shocks by minimizing interaction between actuator and its support structure. The actuator is comprised of a linear motor having stator and voice coil, the voice coil being coupled to the transducer head carrier for displacing same. Stator and voice coil with transducer head carrier are mounted on separate carriages which roll on tracks in low friction engagement therewith and colinear to each other. As current flows through the voice coil and interacts with the stator field, oppositely and equal forces are set up in the voice coil and in the stator, and since both are mounted for colinear displacement, they both are, in fact, displaced.

The electric current flow through the voice coil should be controlled to have similar acceleration and (dynamic) deceleration for each displacement, so that the recoiling stator and the displaced voice coil stop *without* requirement of braking relative to and by interaction with the support on which they roll. Consequently, substantially no shocks are imparted upon the support structure.

Accuracy of positioning in that manner could be controlled by providing creeping motion to center the transducer on the desired track after having traversed the main distance between its previous position and the desired position in that rapid action fashion. However, the present invention provides for acceleration and deceleration control for such an actuator that minimizes the fine position adjustment at the end of the rapid action displacement. Therefor, in accordance with the present invention the voice coil current is controlled for obtaining a velocity profile of voice coil and transducer head carriage to move into the desired position accurately and in minimum time. Acceleration and deceleration phases are timed in dependence upon distance still to be travelled and in relation to the actual velocity in any instant; the moving assembly stops in the position at the required degree of accuracy by operation of a speed command signal that reduces to zero as the object approaches the desired position.

Any object traverses a particular distance at minimum time if it accelerates continuously up to a peak velocity selected so that the immediately succeeding period of deceleration suffices to reduce the speed to zero. If acceleration and deceleration rates are equal, acceleration and deceleration phases each cover half of the total travel time and half of the total distance to be traversed. In case the acceleration rate differs from the rate of deceleration, the respective phases must vary in proportion. The peak velocity obtained is proportional to the square root of the distance to be traversed (the peak velocity is equal to the square root of distance to be traversed times acceleration/deceleration factor, if the two factors are oppositely equal).

In accordance with the invention, these operating conditions are obtained indirectly by the generation of a deceleration command profile to be equal to the square root of twice the deceleration rate times distance from the destination, and along which the object is decelerated, while acceleration (or a constant maximum system speed) prevails up to a speed-distance point on that deceleration curve. Desired and present positions of the object (e.g. transducer head) are represented by digital signals, and the difference represents digitally the distance still to be traversed at any instant. A speed command signal is derived from that difference, to represent the square root of twice the distance yet to be traversed, multiplied by the acceleration/deceleration factor. A directional command is formed concurrently in dependence upon the sign of the difference. As long as the actual speed remains below the declining speed command, there is acceleration; as the instantaneous value of the speed command equals the actual speed, there is changeover to deceleration.

The changeover occurs normally when the object passes the half way mark; at that point the speed command signal is actually reduced to represent the square root of acceleration times initial distance, which *is* the peak speed for minimum travel time across that initial distance. If the actual speed of the object equals that desired peak speed, deceleration begins. The changeover from acceleration to deceleration occurs earlier if the object actually reaches a higher speed, the changeover occurs later and at a lower than the theoretical peak speed, if the object fails to reach that latter speed at the half way point. In other words, the control operation takes care automatically of any deviation from the ideal case.

In case the distance to be traversed is rather large, it may be advisable, however, as a purely precautionary measure, to limit the maximum peak velocity that can be obtained and to limit the speed command accordingly, so that, in fact, a period of constant speed control is interposed between acceleration and deceleration phases.

The actual progression of the voice coil-transducer head assembly (as object) relative to the disk is metered by clocking the progress in units of the digital representation for the distance to be traversed. The digital representation of distance is, in fact, gradually reduced at the rate of that clock, to represent at all times distance still to be traversed. In particular, the speed command signal is reduced to zero as the object approaches the desired position. the profile and contour of that command signal in dependence upon distance from the destination depends only upon the deceleration rate and is the same for all displacements. The voice coil current is controlled through a first servo loop that processes a signal representing actual speed independence upon the speed command signal to determine exactly the changeover to deceleration along that particular deceleration profile, so that the object (carriage) will, in fact, stop in the desired position. The command signal reduces to zero shortly before the moving assembly is in the desired position, as a small lag is needed between command signal profile and actual speed profile, because the difference in any instant is used to sustain deceleration control. A second servo loop ensures that the actual acceleration and deceleration rates equal those represented in the command signal.

It is an additional feature of the invention to provide for the particular transition from rapid action displacement to position maintaining control of the object. The progressive clocking of the object is based on a periodic signal, the periodicity thereof representing the unit length (in time) of digital position and position difference representation. The clock is derived from that signal in such a manner that the digital representation of the position difference is counted down to zero shortly before the object actually reaches the desired position. At that point, the oscillatory signal is used as analog type error signal, the phase of which being chosen so that it has a zero crossing for the desired position.

While the specification concludes with claims particularly pointing out and distinctly claiming the subject matter which is regarded as the invention, it is believed that the invention, the objects and features of the invention and further objects, features and advantages thereof, will be better understood from the following description taken in connection with the accompanying drawings in which:

Figure 1:
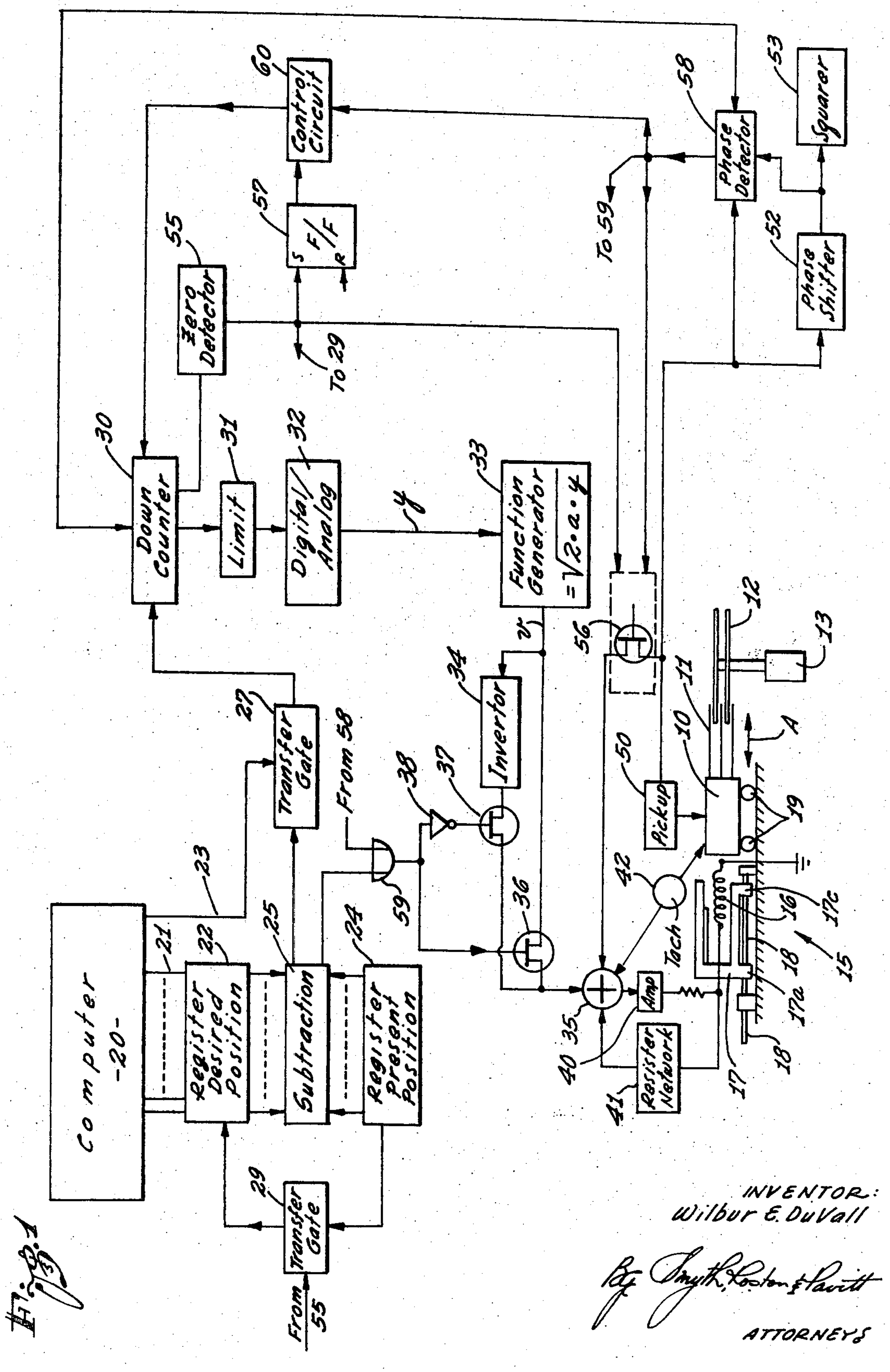
FIG. 1 illustrates schematically a block diagram of the preferred embodiment of the present invention.
Figure 2:
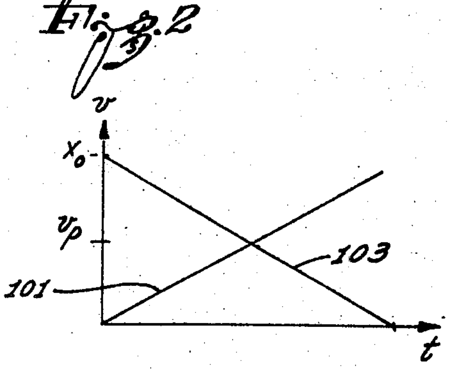
FIG. 2 is a graph illustrating a speed versus time diagram for obtaining minimum displacement time.
Figure 2B:
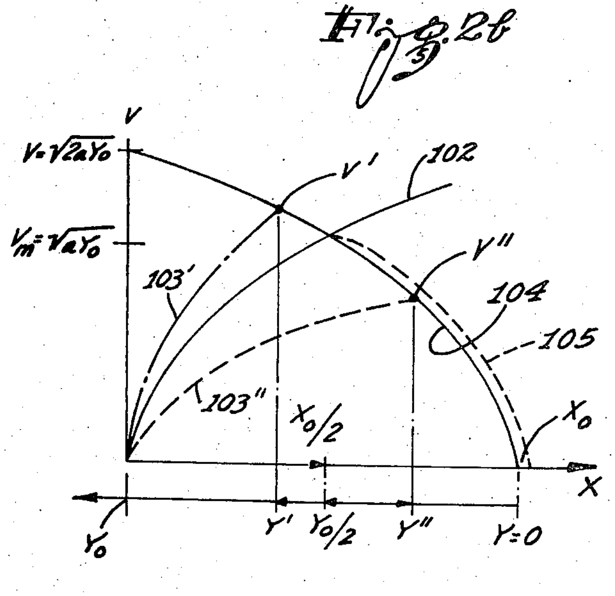
Figure 3A:
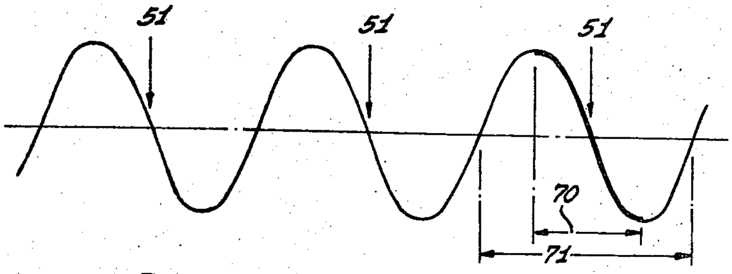
Figure 4:
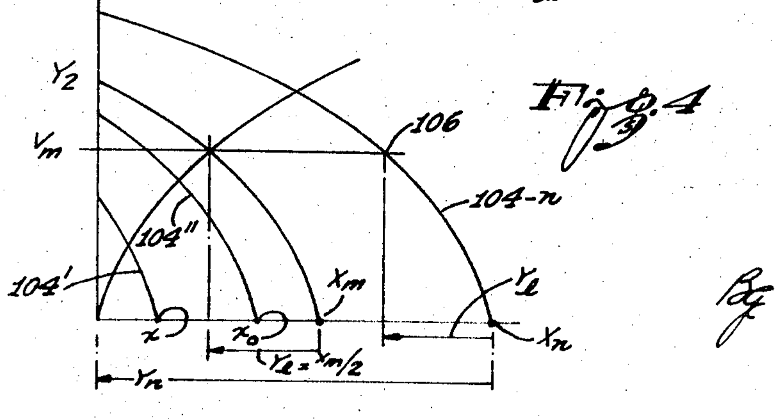

FIG. 2*b* is a graph illustrating actual velocity and command profiles versus displacement as they are pertinent for the embodiment shown in FIG. 1;

FIGS. 3*a*, *b*, and *c* illustrate related signal and clock patterns representing displacement clocking in the equipment shown in FIG. 1; and FIG. 4 is a graph showing a speed versus displacement diagram for different length travel path, showing particularly interpositioning of a constant speed phase.

Proceeding now to the detailed description of the drawing in FIG. 1 thereof is illustrated somewhat schematically to carriage 10 supporting a plurality of transducers 11 for respective cooperation with a stack of disks 12, driven at constant speed by motor 13. The transducers are to cooperate with individual tracks on the disks. As there is but one transducer pair (one read, one write transducer) per disk surface, the transducer assembly has to be positioned in radial direction (double arrow A), which requires displacement of carriage 10.

In the copending application referred to above, a carriage drive system is disclosed, comprised of a linear motor that includes a voice coil cooperating with a recoillessly positioned stator. That structure is schematically indicated in the present case. Reference numeral 15 designates the recoilles linear motor in general. The motor includes a voice coil 16, cooperating with a permanent magnetic stator 17. The linear motor structure of that patent application is designed for minimum mechanical interaction between the displaceable voice coil-transducer carriage and the stator carriage on one hand and supporting and mounting structure on the other hand. Thus, the stator body 17 is mounted by means of ball bearings such as 17*a* on horizontally disposed rods, such as 18, to permit displacement of the stator along a direction that is perpendicular to the axis of the motor-disk system 13-12. The transducer carriage 10 is mounted on wheels 19 that ride on horizontal tracks. Moreover, carriage 10 is retained on a displacement path which is (a) colinear with the displacement path for the stator and (b) radial in relation to the disk and motor axis. For details of voice coil and stator mount refer to the copending application.

The structure of the linear motor operates without intervention of brakes, at least as essential power-consuming (and shock transmitting) devices. Still, transducer carriage displacement must be very fast and very accurate. The control circuit for the voice coil of such a linear motor is designed so that the transducer carriage with voice coil traverses the respective distances in minimum time, whereby the voice coil current is particularly controlled for obtaining a particular velocity profile.

FIG. 2*a* will aid the understanding of certain well known relations, as they are specifically applied to the present invention. An object accelerated by an acceleration $a$ increases its velocity $v$ in accordance with the relation $v = a \cdot t$, where $t$ is time elapsed since starting from a resting position (curve 101). As the object is accelerated, and after having travelled over a distance $x$ its speed is determined by the relation $v = \sqrt{2ax}$, a parabola 102 as depicted in FIG. 2*b*.

An object reduces speed, from a speed $vo$ to zero, by operation of a deceleration factor $-a$, in accordance with the relation $v = v_o - a \cdot t$ (curve 103) in FIG. 2*a*. As the object decelerates from a velocity V in point x, at the rate $-a$, and after having travelled over a distance from the point x to a point xo, its speed is determined by the relation $v = \sqrt{2a \cdot (xo - x)}$, curve 104 in FIG. 2*b*, wherein *xo* defines the location where the object comes to rest, *x* and *xo* being measured *from* an arbitrary point of origin ($x$=0), for example, where acceleration has begun. If y denotes the distance from the destination point, $y = xo - x$, the speed is given by $v = \sqrt{2ay}$. In the following we shall describe the speed-distance for the acceleration in terms of distance *x* from the *starting* point of initially accelerated motion, while the speed-distance relation for deceleration will be described in terms of distance *y* from the destination point. In absolute terms, of course, $so = yo$.

It will be significant to remember, that as long as an object is decelerated at a rate $-a$, beginning at a distance $y'$ or a distance $y''$, from the destination and respectively at volicities $v'$ or $v''$, deceleration will progress along that curve (104), and the object will come at rest in the same destination position, where deceleration curve 104 intersects the *x*, *y* axis. THus, curve 104 teaches that in case the object travels at a particular speed and can be decelerated at the rate *a*, the deceleration must begin when the object has distance *y* from the desired position that is related to the particular speed by $v = \sqrt{2ay}$.

An object traverses a particular distance *xo* at minimum time, if accelerating for half the time it is in motion and decelerating for the remainder of that period, assuming acceleration and deceleration factors are oppositely equal. After half the total travel time has elapsed, it passes the half mark $xo/2 = yo/2$. At that point, its velocity, the $v = \sqrt{2 \cdot a \cdot xo/2} = \sqrt{a \cdot xo} = vp$, *vp* being the peak velocity, the objects obtains when accelerating and decelerating at similar rates and for equal periods. In other words, an object that was accelerated along velocity profile curve 102, from $x = o$ to $x = xo/2$, will stop at *xo* if after that point of intersection of curves 102 and 104, the velocity profile follows curve 104.

Deceleration curve 104 permits generalization, as the object will stop in *xo*, if deceleration begins anywhere on that curve. Assuming the rate of acceleration happens to be larger than *a*, a velocity profile such as 103' may result. In order to stop the object in the desired position, deceleration must begin earlier, namely when the object reaches point $y'$, where curve 103' intersects curve 104. Analogously, in case the rate of acceleration is lower than *a*, a velocity profile such as 103'' may result, intersecting curve 104 at point $y''$. In either case, the object will stop at *xo*.

After these general considerations I return to the specific problem at hand. The objective is to move transducer carriage 10 between particular identified positions corresponding to tracks on the disks. These tracks may be identified by numbers. The disk system is presumed to be, for example, a memory extension or bulk storage device for a computer 20, which, at times (through an appropriate device control interface system) provides track identifying numbers in output lines 21. It may be presumed that these tracks identifying numbers are proportional to the relative position of the transducer carriage 10 along the radial direction of the disk system, so that such track number can be interpreted also as a particular carriage position on a chosen scale, the radial distance between two adjacent tracks being the unit of that scale.

The number identifying the desired carriage position is set into a first register 22. The loading process is accompanied by a command signal in a line 23. A second register 24 holds digital representation in similar format of the present position of transducer carriage 10. A substracting circuit 25 responds to the differences of the two numbers. Conveniently, the substracting operation may be a serial one, so that a bit stream appears in an output line 26 of the substracting circuit, passing a gate 27 to serially load a register counter 30. These subtracting and loading operations may be parallel operations, but as the electronic operating times are significantly faster than the soon ensuing motion control, the more economical serial operation may suffice.

The operation of gate 27 by the command in line 23 is a mere symbolic representation of the fact that loading of register counter 30 is restricted to the digital difference ascertained after a loading process of register 22. There is no further transfer from subtracting circuit 25 into register 30 until later, when a new number is set into register 22.

The digital number held in register 30 after completion of subtraction and transfer is a digital representation of the displacement path *yo* to be traversed by the carriage. The subtraction resulted also in a sign, as the carriage may need to be displaced toward a more inner track or to a more outer track from its present position. The resulting sign bit is a signal in a second output line 28 of subtracting circuit 25.

The circuitry to be described next serves to move and to displace the carriage in the shortest possible time subject to the constraint, that there is a rather accurately predetermined rate for acceleration and deceleration. The control must result in zero speed when the carriage has arrived at its destination without requiring mechanical braking, bearing in mind that control for suppressing of hunting, in case of overshoot, wastes time! Also, the displacement control should change directly into a position tracking control after the displacement, to maintain the transducers in the particular relative position to the disks.

Disregarding for the moment limiter 31, the embodiment illustrated in FIG. 1 is predicated on the fact that after an initial phase of acceleration and for a particular rate of *actual* acceleration (regular or irregular), deceleration at *a* particular rate *must* begin at a distance from the desired position, where the actual speed curve intersects the deceleration speed curve (104) that leads to zero speed at the desired position *xo*. As long as carriage 10 has speed and distance respectively too low and too far from the destination for deceleration to lead to the destination point, the carriage should be accelerated (or move at constant speed under special conditions, overriding the concern for absolute minimum time).

If acceleration and deceleration rates are oppositely equal, the two periods are equally long, and acceleration tends to reach peak velocity $vp = \sqrt{a \cdot yo} = \sqrt{a \cdot xo}$ at the half way mark, however, the system should not rely on that assumption as a fixed parameter; as that would be essentially an open loop type consideration.

On the other hand, once deceleration has begun, that previous peak value per se has no further significance for the control operation. During acceleration, $vp = \sqrt{a \cdot xo}$ is the speed towards which the moving system is accelerated; during deceleration, the desired speed can (and will!) be reduced to zero, regardless or whether or not that desired peak velocity has actually been reached or even exceeded. Specifically, the deceleration profile 104 has to be represented by signal for each operation, to begin deceleration after acceleration has lead to any point on that curve 104.

The digital signal held in counter 30 is converted into an analog signal by device 32, the output signal of which is thus an anlog representation of the distance $y$ that has to be traversed. A function generator 33 responds to that signal to provide a representation that is directly the square root of twice that distance $y$, ($yo$ at first) times the deceleration rate $|-a|$ . The output of function generator 33 is a speed command signal, and as such it is applied to a summing point 35 as a first input thereof.

The direction of the motion to be obtained is reflected in the polarity of the signal as it is applied to the summing point. By proper association of polarity, the output of generator 33 is applied directly to summing point 35 via an FET-switch 36 in response to a particular value of the sign bit as derived from subtracting circuit 25 via line 28. In case the sign has opposite value, a FET switch 37 is opened by the complement of the sign bit (inverter 38) to apply the output of function generator 33 via an inverter 34 to summing point 35.

The output of summing point 35 is an error signal which is applied to an amplifier 40 for control of voice coil 16 of linear motor 15. A resistance network 41 is coupled to the motor and to the summing point 35, to establish a conventional acceleration-deceleration loop. Particularly for deceleration, that loop stabilizes to a dynamic deceleration rate of $-a$. During acceleration, it may stabilize to the same rate.

A tachometer 42 is drivingly connected to motor 15 or to carriage 10 to provide a speed responsive signal that is also fed to summing point 35 and at polarity that represents the direction of movement. Thus, a second loop is closed which tends to saturate amplifier 40 as long as the actual speed is below the command speed. In this case the first, acceleration dominates. Without further measures motor 15 will accelerate up to the speed as determined by the speed command signal, and the motor could then continue to run at that speed. However, the circuitry to be described next operates to introduce the required deceleration and homing operation to cause the carriage to stop, or nearly to stop in the desired position.

Figure 3B:
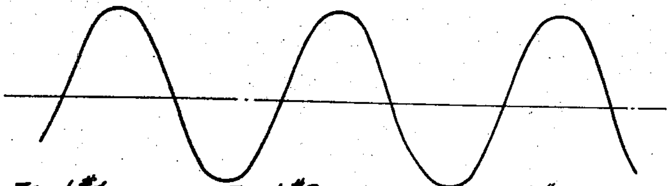
Figure 3C:
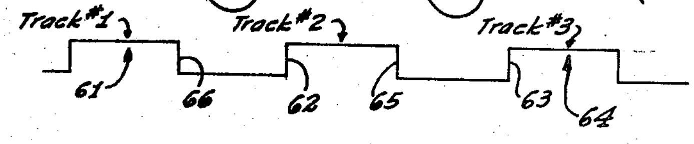

A position transducer 50 is provided. A ruler-like element analogous to a clock track or the like may be provided on carriage 10, and a stationary transducer 50 is a pick up means that provides a periodic signal (FIG. 3) as the ruler on the carriage passes the transducer. The ruler may be a magnetic marker bar, a rack or the like, or an optical contrasting device, while pick up means 50 senses the spatially periodic differences in characteristic on that ruler.

The periodicity of the manifestations on the ruler should bear a definite relationship to the several particular positions carriage 10 is to assume. Conveniently, the wavelength of the periodic pattern on the ruler is equal to the radial track distance on the disks. Particularly, the phase of the ruler is adjusted so that the desired positions of the carriage (when a transducer of assembly 11 is dead-center above track) correspond to zero crossings (from + to −) of the ac output signal (or of the ac equivalent) of pick up 50. These phase points are denoted by arrows 51 in FIG. 3*a*. Thus sequential ones of these phase points represent two adjacent carriage positions, (a) relative to two adjacent tracks, and (b) as defined by two sequential track identification numbers of the type applied by computer 20 to the desired position register 22.

A phase shifter 52 provides a signal that is phase shifted by 90° to the transducer output (or such a phase shifted output is derived directly, but separately, from the ruler on carriage 10, by pick up means 50). That signal is depicted in FIG, 3*b* in phase alignment with the signal in FIG. 3*a*. Thus, the peaks of that phase shifted output signal coincide with particular track center positions. A squaring circuit 53 converts the output of phasing circuit 52 into a signal that constitutes a pulse train (FIG. 3*c*) developed during relative motion between carriage and pick up. The center of each pulse represents *a* track position.

Now, it has to be considered that register 30 can be operated as a down counter. The output pulses from squaring circuit 53 serve as counter clocking signals. Thus, as voice coil 16 and carriage 10 move, the clocking arrangement 50-52-53 causes the content of counter 30' to be decremented in units of recording track distance units traversed. Details of that counting process will be discussed below, suffice it to say that the content of counter 30 tracks the diminishing distance y the carriage has still to traverse.

The diminishing distance y is converted by function generator 33 into signal $\sqrt{2ay}$. Thus, this speed command signal is gradually diminished, in accordance with the profile curve 104. Therefor, generator 33 generates a speed command curve 104 during progression of the carriage beginning at a speed value equal to $\sqrt{2 \cdot a \cdot yo}$ with $yo$ being the initial distance to be traversed. That speed command signal gradually declines in accordance with the function $\sqrt{2 \cdot a \cdot y}$ as the distance $y$ of the carriage from that point of destination ($xo$, $y = 0$) is being reduced.

The actual speed of the carriage is zero at first, so that the output of tachometer 42 is zero, and summing point 35 forms a large error signal that is actually equal to the initial command signal $\sqrt{2 \cdot a \cdot yo}$. During this phase, control through loop 41 prevails and produces constant acceleration at rate $a$. Carriage 10 will obtain velocity along the profile of curve 102 (FIG. 2*b*). Concurrently thereto, the command signal reduces along curve 104 as the distance $y$ still to be traversed reduces. Acceleration will continue until the increasing actual speed about equals the command speed. Usually, this will occur at about the half way mark defined $xo/2 = yo/2$, but may be earlier, or later. In either case, the output of summing point 35 reverses sign when the *actual* speed (as represented by the output of tachometer 42) has reached *a* command speed value on curve 104 as presented by function generator 33. That is the speed-distance point for operation where deceleration must (and will) begin.

The diminishing distance causes the command speed to be reduced along curve 104, and the feedback loop 41 for motor 15 tracks the reduction in speed command by operating the motor in the decelerate mode. The actual speed is slightly larger because of response delay (curve 105). Thus, the actual velocity profile lags the command profile so that there is an operation sustaining differential throughout the deceleration phase. The lag (in time) of the actual speed reduction in relation to the command reduction, due to response delay, means that the actual velocity profile (105) intersects the distance axis slightly behind the $y = 0$ (or $x = xo$) point. However, the actual deceleration (by operation of loop 41) equals the command signal deceleration rate (as represented by function generator 33), so that curves 104 and 105 are parallel. Nevertheless, due to the response delay and lag, motor 15 still moves when the command speed signal becomes zero. That this is not detrimental to the accuracy will become apparent after the counting process has been described in some detail.

To simplify explanation, reference is made to FIG. 3*a*, and it may be presumed that the carriage 10 is in track No. 1 position (i.e. carriage 10 has position that all recording transducers are above the respective track No. 1 of all disks). Thus, register 24 holds number "1". Assuming now that a "3" is set by computer 20 into register 22, carriage 10 has to be moved to a position corresponding to track No. 3. At the appropriate sign, subtracting circuit 25 sets a "2" into register 30, and a command signal, equal to $\sqrt{4a}$ is given to the summing point 35 for further processing. Prior to carriage movement, the output of transducer or pick up 50 is "high" (point 61) as steady state. At a clock edge, marked 62, the content of counter 30 is decremented by one unit, i.e., from "2" to "1" and upon clock edge 63 the content of counter 30 is reduced to "zero". This will occur *before* the carriage has actually reached track No. 3 position (point 64).

Compare now the output signal of pick up device 50 (FIG. 2*a*) with the period of that particular pulse, on whose leading edge counter 30 reached zero. That particular signal portion extends from a peak (coinciding with the counter trigger edge 63) to a negative extremity while traversing zero *at* the desired position (point 64'). It will be recalled, that that particular type of zero crossing is to serve as reference point for a on-track position of the disk transducer carriage. Thus, that particular signal portion, marked by a dotted line along the principal trace in FIG. 3*a*, may serve directly as position error signal.

Turning now to the deceleration lag, the command signal during the deceleration period follows curve 104 in representation of speed reduction versus distance at the contemplated rate. However, due to inherent delay, the speed reduction lags, and the carriage actually experiences speed reduction along curve 105. Thus, as counter 30 drops to zero which instantaneously followed by reduction to zero of the command signal $v$, carriage 10 is actually still moving, but rather slowly. The homing position as digitally represented by "0" (i.e. $y = o$, $x = xo$), coincides actually with a position corresponding to signal edge 63, and *not* with the true track position 64. This represents an inherent, built-in "error" of a quarter track-to-track distance. That "error" distance is essentially being traversed by the carriage as actually moving in accordance with the somewhat shifted curve 105! It will be recalled that the relative shift between curves 104 and 105 is actually necessary, as the resulting instantaneous difference is needed during the main deceleration phase to maintain an error output of summing point 35 for saturating amplifier 40 so as to provide deceleration input for the motor circuit.

As the content of counter 30 has been decremented to zero, the carriage is about to move into correct position and in proper direction. The input for summing point 35 as derived from tachometer 42 is relatively low at that point, and the output of function generator 33 has already dropped to zero with counter 30. A count-zero detector 55, connected to counter 30, responds and closes a FET switching circuit 56, to apply the output of carriage position transducer 50 to summing point 35 *as* error signal. The polarity of that error signal depends upon the direction of motion at the time of this final deceleration phase. This direction is detected by a phase detector 58 which responds to the phase relation between the output wave of transducer 50 and the phase shifted signal from circuit 52 at the time of a clock. The speed representing input for summing point 35, as still derived from tachometer 42, serves now as a *rate* information for the position control so as to enhance loop gain for that purpose. The time constant for tachometer control is also reduced in the position control mode.

The dotted line in FIG. 3a delineates a displacement range 70 in which the output signal of carriage position transducer 50 is a direct and approximate analog representation of the position displacement error; near the edges of the larger range 71, the error signal will still have the proper polarity and the control still operates. However, clock pulses are produced anew, if displacement of the carriage exceeds range 70. As a consequence, clock pulses are produced and applied to counter 30.

The zero detector 55, when responding for the first time, may have set a control flip-flop 57 for controlling a control circuit 60 to operate counter 30 selectively as up or as down-counter. As long as flip-flop 57 is reset, the regular down-counting operation of counter 30 prevails. The selective counter operation after termination of rapid displacement mode is controlled from phase detector 58 as the counting direction depends upon direction of displacement.

The phase relation also determines the sign at which the output of counter 30 is to be used (see OR-gate 59). The counter output 30 is processed also here by function generator 33 to obtain signal $y$ as before. Thus, as a large position error is incurred, operation returns temporarily to the rapid action displacement mode. After a new, desired position signal is set into register 22, the accompanying signal in line 23 resets control flip-flop 55, so that the content of register is determined thereafter by the subtractive operation.

The limiter 31 in FIG. 1 has not yet been explained. The rapid action displacement operation as described is carried out in that manner for traversing only relatively small distances. As shown in FIG. 4, the carriage moves out of a particular position always along curve 102 in the acceleration phase. Depending upon the destination, deceleration occurs along one of the parabolas 104, 104' or 104'' etc. and which are parallel to each other. It was found, however, undesirable to have the carriage accelerated to a rather high peak velocity when moving, for example, from the outermost track to the innermost track. Thus, maximum speed that can be reached should be limited even though this may extend somewhat the displacement time. This is not a principle limitation, but merely a point of practicality. Thus, limiter 31 may be a number converter to apply a particular distance number *xm* to D/A converter 32 for all numbers in counter register 30 exceeding that number, equivalent to a maximum speed vm that is related to the distance value *sm* to $vm = \sqrt{a \cdot xm}$. This, in turn, corresponds to a minimum distance *yl* from any point of destination at which deceleration must begin (i.e., $vm = \sqrt{2 \cdot ayl}$).

As a consequence, a steady command speed signal *vm* is produced for as long as the count-down operation in register 30 has dropped to the corresponding distance *yl*. The carriage 10 has been accelerated in the meantime until its speed equals vm, whereupon the carriage continues to move at *that* speed. The initial distance may have been *yn*, (or *xn* as measured from the starting point) so that the command curve is as indicated by 104-*n*. Deceleration begins when the count-down operation has progressed so that the content of counter register 30 equals (and tends to be lower than) the limit value producing *vm*. This occurs at point 106 where the deceleration curve (104-*n*) as referenced to the particular point of destination traverses the *vm* level.

Count state zero detector 55 performs still another function. As soon as responding for terminating the rapid displacement mode, it opens a transfer gate 29 and may also enable a serial shift clock (conveniently derived from one of the available computer clocks) to shift the content of register 22 into register 24 as the previously "desired position number" is now the "-present position number". Register 22 is now ready to receive another number.

In case carriage 10 has to return to track position No. 1, the operation is reverse, and it can be seen, that counter clocking occurs on the clock edges 65 and 66 as they will be rising clocks when the time in that pulse sequence runs from right to left.

In accordance with a modification, countdown operation could proceed in register 24, and register 30 merely receives the updated difference. It should be mentioned also, that tachometer 42 and position transducer 50 are shown as separate units. More generally, it will be appreciated, that there is a common means from which signals are derived representing speed and position of carriage 10.

The invention is not limited to the embodiments described above but all changes and modifications thereof not constituting departures from the spirit and scope of the invention are intended to be included.

I claim:

1. Apparatus for control of a carriage for transducers in a disk file, the carriage connected to a linear motor having stator and voice coil, the control provided as control of current flow through the voice coil, and including a control circuit in which the square root of an analog value representing the difference between actual and desired position of the carriage is generated and used as reference signal for obtaining controlled acceleration and controlled deceleration of the voice coil and carriage, the improvement comprising:

first means providing digital representation of the desired position of the carriage;

second means providing digital representation of the present position of the carriage;

third means connected to the first and second means for obtaining the digital difference between said digital representations, as digital distance representation, the third means connected to the control circuit for the control circuit to provide a command signal representing the square root of the difference of said positions as defined by said digital difference;

fourth means providing digital representation of different positions of the voice coil and carriage; transducer means scanning the fourth means upon displacement of the voice coil and carriage and providing a train of oscillatory signals;

pulse forming means connected for extracting clock pulses from the oscillatory signals;

fifth means connected to the pulse forming means for receiving therefrom the clock pulses and connected for reducing the digital difference of said position at the rate of the clock pulses as the voice coil and object traverse said distance, said difference being reduced to zero by operation of the control circuit as the carriage approaches the desired position, the command signal likewise reducing to zero therewith; and a second control circuit connected to receive said oscillatory signal or a replica thereof as fine control, error signal near a zero crossing, said first control circuit connected for receiving said error signal to fine-position control the voice coil and carriage, when the digital representation of the present position equals the digital representation of the desired position as represented by a digital representation of zero of said difference.

2. Apparatus as in claim 1, including limiter means, operating to limit the command signal to a maximum value for obtaining constant speed operation at that maximum value in between acceleration and deceleration, there being a changeover from constant speed operation to deceleration when the distance to be traversed has reduced to a value tending to lower the command signal below the value as limited.

3. Apparatus as in claim 1, the linear motor having stator and voice coil, the voice coil coupled to the object, there being a second carriage means for mounting the stator, for relative low friction displacement of the stator and the voice coil along a colinear path, said fourth means providing said digital representation independently from the position of the stator.

4. Apparatus as in claim 1, the disks of the disk file each having a plurality of concentric tracks; the fourth means providing said digital representations in units of distance between radially adjacent tracks of the plurality.

* * * * *

UNITED STATES PATENT OFFICE

CERTIFICATE OF CORRECTION

Patent No. 3,699,555 Dated October 17, 1972

Inventor(s) Wilbur E. DuVall

It is certified that error appears in the above-identified patent and that said Letters Patent are hereby corrected as shown below:

Page 1, column 1, line 4, correct the spelling of the assignee herein to read "Xerox Corporation".

Signed and sealed this 20th day of November 1973.

(SEAL)
Attest:

EDWARD M.FLETCHER,JR.
Attesting Officer

RENE D. TEGTMEYER
Acting Commissioner of Patents

FORM PO-1050 (10-69)

USCOMM-DC 60376-P69
☆ U.S. GOVERNMENT PRINTING OFFICE : 1969 O—366-334.